US010620341B2

(12) United States Patent
Johnson et al.

(10) Patent No.: US 10,620,341 B2
(45) Date of Patent: Apr. 14, 2020

(54) SYSTEM AND METHOD FOR MODIFYING AN EARTH MODEL

(71) Applicant: CHEVRON U.S.A. INC., San Ramon, CA (US)

(72) Inventors: Daniel P. Johnson, Houston, TX (US); Konstantin Osypov, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 95 days.

(21) Appl. No.: 15/383,690

(22) Filed: Dec. 19, 2016

(65) Prior Publication Data
US 2018/0172861 A1 Jun. 21, 2018

(51) Int. Cl.
G01V 1/36 (2006.01)
G01V 99/00 (2009.01)
G01V 1/28 (2006.01)
G06T 19/20 (2011.01)

(52) U.S. Cl.
CPC .......... *G01V 99/005* (2013.01); *G01V 1/282* (2013.01); *G01V 1/36* (2013.01); *G01V 2210/59* (2013.01); *G06T 19/20* (2013.01)

(58) Field of Classification Search
USPC ........................................................ 702/16
See application file for complete search history.

(56) References Cited

U.S. PATENT DOCUMENTS

| 7,480,206 | B2 | 1/2009 | Hill |
| 9,164,188 | B2 | 10/2015 | Bruun et al. |
| 2008/0165619 | A1* | 7/2008 | Bachrach ............ G01V 1/30 367/38 |
| 2008/0259077 | A1* | 10/2008 | Liepa ................ G06F 17/50 345/423 |
| 2010/0332139 | A1 | 12/2010 | Bruun et al. |
| 2011/0267921 | A1* | 11/2011 | Mortel ............... G01V 1/28 367/25 |
| 2012/0086719 | A1* | 4/2012 | Brown ............... G06T 17/30 345/582 |
| 2013/0246031 | A1* | 9/2013 | Wu ................... G06T 17/05 703/10 |
| 2014/0040324 | A1* | 2/2014 | Marcolino .......... G06F 17/30312 707/812 |
| 2014/0379317 | A1* | 12/2014 | Sanden .............. E21B 43/00 703/10 |
| 2016/0146961 | A1* | 5/2016 | Ratcliffe ............ G06F 17/5009 703/2 |

(Continued)

FOREIGN PATENT DOCUMENTS

| WO | 2010082969 A1 | 7/2010 |
| WO | 2015104640 A3 | 7/2015 |

*Primary Examiner* — Paul D Lee
(74) *Attorney, Agent, or Firm* — Marie L. Clapp

(57) ABSTRACT

A method is described for modifying an earth model including receiving an earth model containing one or more surfaces with surface geometries, such that at least two surface depth locations exist for some horizontal positions; perturbing elastic properties within the earth model; and generating a modified earth model by modifying the surface geometries within the earth model while preserving seismic travel times of the earth model such that after an initial user parameterization all updates of the surfaces are done without additional user input. The method may be executed by a computer system.

7 Claims, 4 Drawing Sheets

(56) References Cited

U.S. PATENT DOCUMENTS

2017/0192118 A1\* 7/2017 Du .......................... G01V 1/282
2017/0248712 A1\* 8/2017 Ascough ................. G01V 1/282
2018/0120464 A1\* 5/2018 Sun .......................... G01V 1/48

\* cited by examiner

SYSTEM AND METHOD FOR MODIFYING AN EARTH MODEL

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for modifying earth models of the Earth's subsurface and, in particular, to a method of updating an earth model by warping surfaces while preserving seismic travel times.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. Seismic imaging methods such as migration (e.g., Kirchhoff migration, least-squares migration, reverse time migration, Gaussian beam migration) generally require an earth model as input. The earth model may be a 2-D or 3-D representation of physical properties of the subsurface, including but not limited to at least one of P-wave velocity ($V_p$), shear-wave velocity ($V_s$), density ($\rho$), and anisotropy (e.g., $\gamma$, $\delta$, $\varepsilon$). In some instances, these properties will be divided into distinctive formations such as layers and/or geobodies, which may include salt bodies. The layers and/or geobodies may be delineated by surfaces and points along each surface may have an associated implicit seismic traveltime, which is dependent on the physical properties of the subsurface and the geometry of the surfaces. These physical properties may also be used in forward modeling or demigration to obtain seismic travel times associated with each surface in the earth model. When represented in a computer, the earth model may be composed of a set of triangulated surfaces which divides space into a set of regions. Each region is completed surrounded by surfaces, making each region "air tight" so to speak, aside from the outermost "universe" region. Each region is assigned a seismic velocity function, $V_R(r)$, where r is a 3-D cartesian vector, with each $V_R(r)$ being a cartesian grid, a constant function or a parametric function. These models provide a way to represent a velocity function, $V_M(r)$ for use in seismic migration. This function is evaluated as a two step process: 1) Determine which region contains r and 2) evaluate the $V_R(r)$ associated with the region. If the boundaries/surfaces of these formations in the earth model do not accurately match the physical boundaries in the real subsurface that the seismic data was recorded from, the seismic imaging will result in a poor image with problems such as, but not limited to, seismic horizons being located out of position and poor focusing of the seismic events. The poor seismic images make proper interpretation of the subsurface difficult.

The ability to define the location of surfaces in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

Conventional methods for updating the earth model to show more accurate surfaces are either accurate but computationally expensive or computationally inexpensive but not accurate. For example, known methods include:

Method A: Remove all surfaces below the uppermost region containing a change in $V_R(r)$, then one-by-one from top to bottom apply: 1) 3-D seismic migration of the data originally used to develop the original model, 2) reinterpretation of the surface at the base of the region and 3) construction of a model. These three steps are repeated until all needed surfaces are added to the model. This approach is extremely slow and computationally expensive, requiring often many months of work, but potentially yields the most accurate solution.

Method B: Use normal ray map demigration with the original model and then iteratively apply from top to bottom: 1) exploding reflector ray map migration and 2) construction of a model. This model is then used in the next iteration for raytracing. This approach is more rapid that method A, but suffers from stability issues with the raytracing used in the map demigration and migration: wild rays are possible resulting in mangled surfaces and shadow zones may yield demigration/migration impossible in certain areas.

Method C: Use vertical time invariance rather than normal ray time invariance. Stability is high, and the method can be implemented in a manner such that the original model is simply warped into the updated model, eliminating the model reconstruction step. The accuracy can be poor, however, for models with significantly dipping surfaces or substantial lateral velocity changes, such as models containing salt bodies.

There exists a need for a fast, accurate method of updating earth models that allow for improved subsurface interpretation.

SUMMARY

In accordance with some embodiments, a method for modifying an earth model including receiving an earth model containing one or more surfaces with surface geometries, such that at least two surface depth locations exist for some horizontal positions; perturbing elastic properties within the earth model; and generating a modified earth model by modifying the surface geometries within the earth model while preserving seismic travel times of the earth model such that after an initial user parameterization all updates of the surfaces are done without additional user input is disclosed. The modification of the surface geometries may include dividing the surfaces into sections; specifying actions and parameters for each of the sections; warping each of the sections as specified by the actions and the parameters; and identifying and smoothing seams between each of the sections.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of modifying an earth model. These embodiments are designed to be of particular use for accurate and fast earth model updating even in the presence of steeply dipping boundaries and large lateral velocity changes.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The present invention includes embodiments of a method and system for accurately and quickly updating an earth model. The problem solved is to adjust the geometry of the triangulated surfaces of the earth model in response to changes in the $V_R(r)$ functions such that the original and warped models are approximately time invariant with respect to each other. For example, demigration of a given surface in each model will produce essentially equivalent time surfaces (if displayed together, the surfaces will essentially overlie or have essentially identical times at a given x-y location). This problem is termed herein as model warping.

Figure 1:
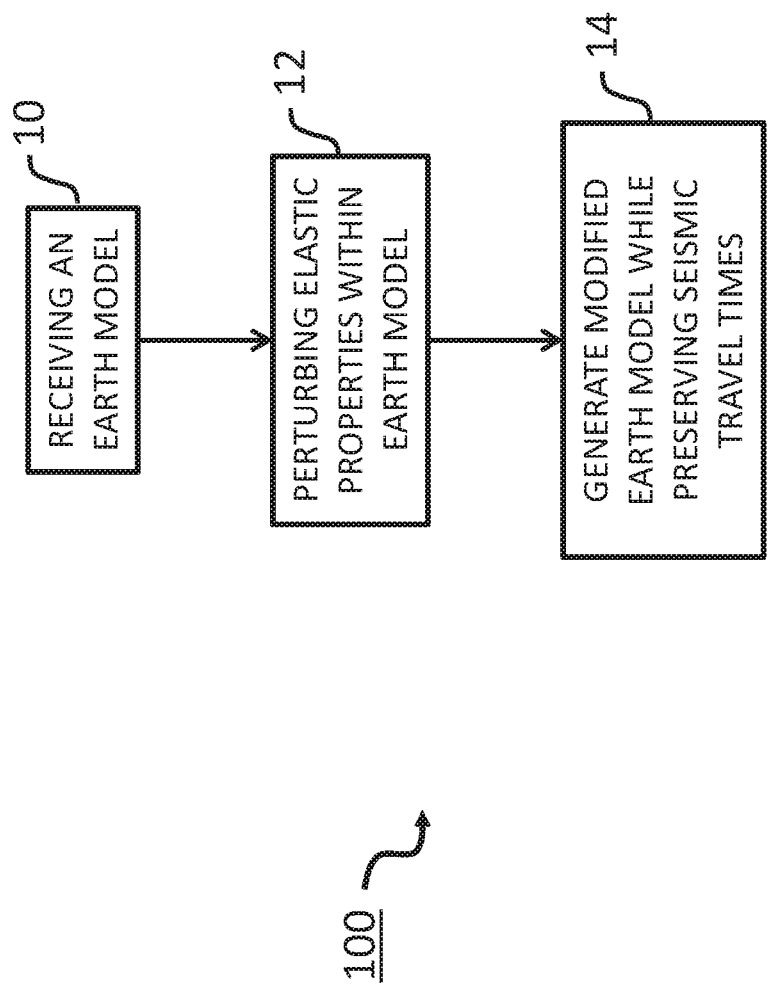
FIG. 1 illustrates a flowchart of a method of modifying an earth model, in accordance with some embodiments.

FIG. 1 illustrates a flowchart of a method 100 for updating an earth model of a subsurface volume of interest. At operation 10, an earth model is received. The earth model is a 2-D or 3-D representation of elastic properties of the subsurface. These properties may include P-wave velocity, shear wave velocity, density, and anisotropy. Points on the surfaces in the earth model will have an implicit seismic travel time that may be calculated along a ray normal to the surface and depends on the elastic properties and surface geometries in the earth model, including the elastic properties and surface geometries in regions remote from the point in question.

Figure 2:
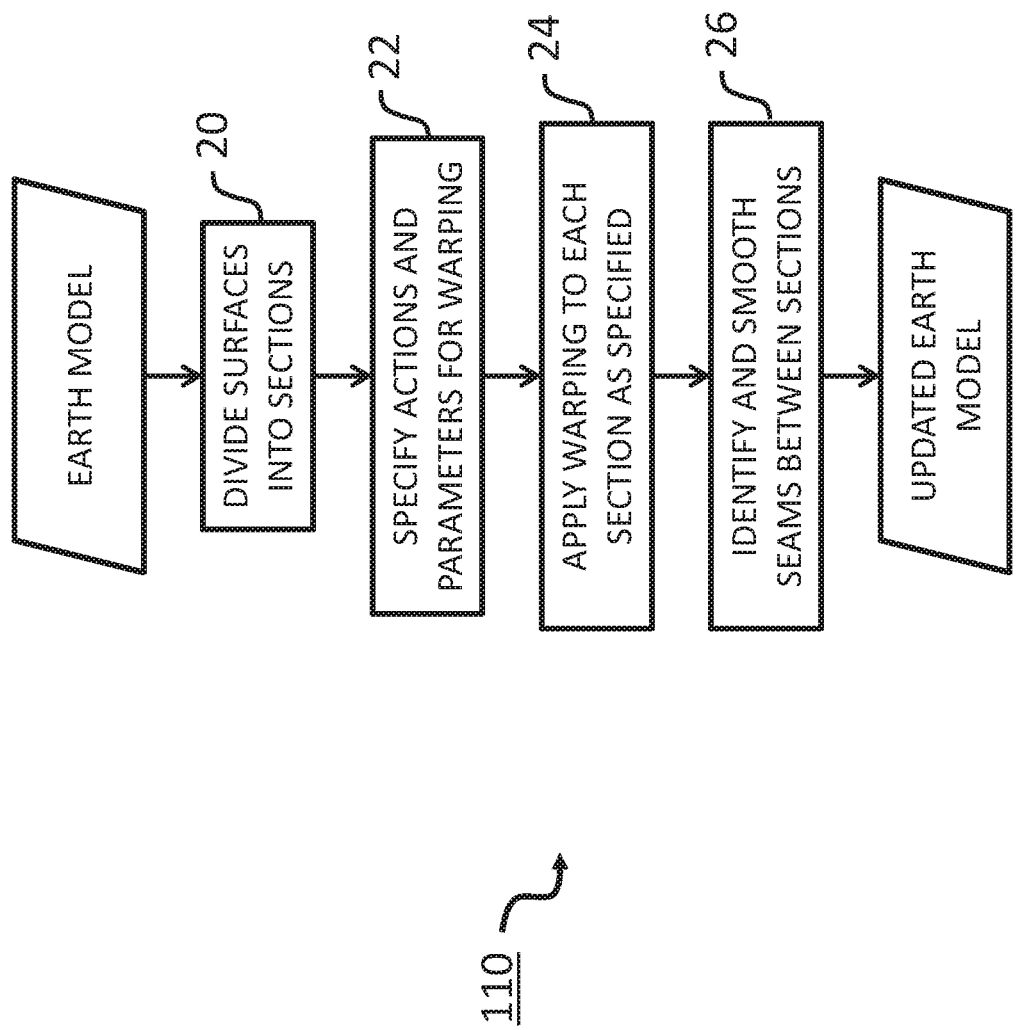
FIG. 2 illustrates a flowchart of a method for a step of modifying an earth model, in accordance with some embodiments.

At operation 12, one or more elastic properties ($V_R(r)$ functions) in the earth model are perturbed. A method for doing this is shown in FIG. 2. The method 110 in FIG. 2 receives an earth model including surfaces with initial geometries. As previously disclosed, the earth model may be composed of a set of triangulated surfaces which divides space into a set of regions. FIG. 3A shows a diagram of a 2-D representation of such a model, containing a surface 30 and a surface 31. Referring again to FIG. 2, the method then proceeds to operation 20 where the surfaces of the model are interpreted into sections. Each section may be identified by an integer index and consists of a set of surface vertices. Each vertex of every surface is assigned to a single section. Each section is meant to represent one of three possibilities:
a) a part of a surface which may be imaged in a single step using a conventional layer stripping process;
b) a surface region that is not imaged; or
c) a surface region that is not expected to be changed due to changes in the various $V_R(r)$ functions.

Figure 3B:
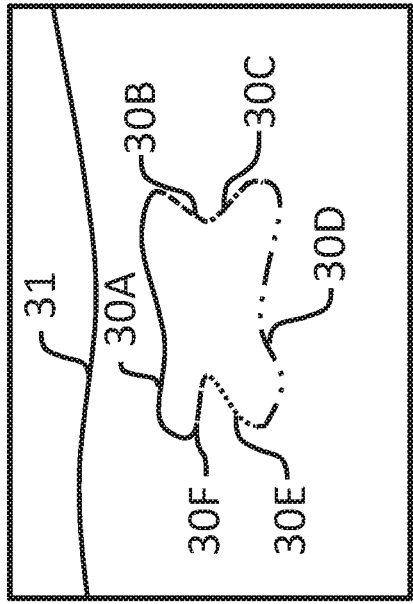
FIGS. 3A-3C demonstrate steps of some embodiments.
Figure 3C:
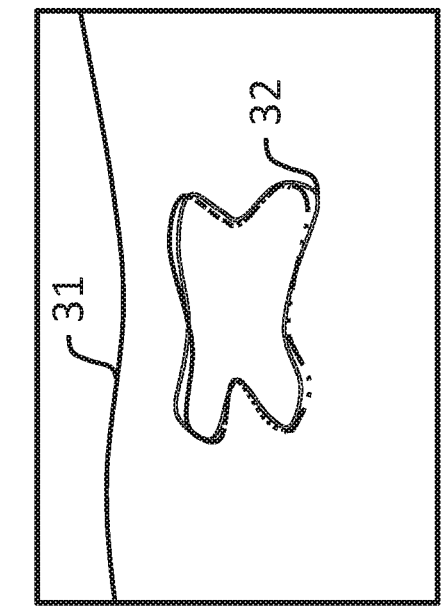
Figure 3A:
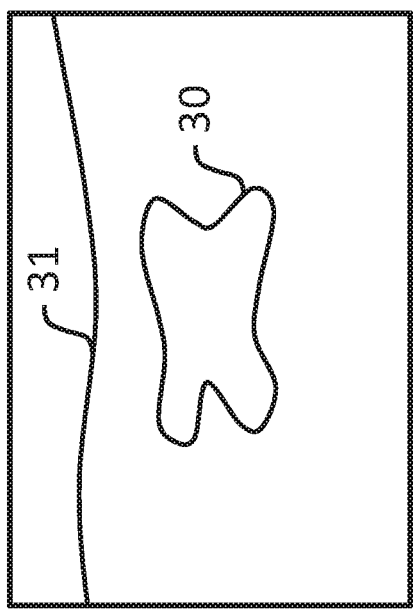

FIG. 3B shows an example of surface 30 from FIG. 3A being divided into sections 30A-30F Surface 31 has not been divided and will be treated as one section.

At operation 22, the user specifies a series of actions to be applied in succession in order to warp the surface. Each action has the following parameters:
a. section index (parameter 24a)
b. an action (parameter 24b), which may be one of three options:
  i. Compute. This option signifies that warping vectors will be computed for each vertex in the section.
  ii. Interpolate. For this option warping vectors are generated via interpolation from neighboring sections where a "compute" action was applied.
  iii. None. No warping is applied to these sections.
c. A ray start region (parameter 24c). For a given section, an exploding reflector ray, defined as a ray traced from a surface in a velocity model with its starting phase velocity vector parallel (or anti-parallel) to the surface normal, may be traced from either side. This parameter chooses between these two possibilities.
d. A normal vector smoothing radius (parameter 24d)
e. A warp vector Gaussian smoothing 6 (standard deviation) (parameter 24e)
f. A maximum aperture, which is the horizontal distance between the starting and ending points of a ray (parameter 24f).

At operation 22 the user also supplies additional global parameters which are used throughout the earth model:

a. A seam Gaussian smoothing 6 (parameter 25a)
b. A near seam smoothing distance (parameter 25b)
c. A ray datum, which is normally the surface covering the top of the model (parameter 25c)
d. A set of "new" velocity functions or other elastic properties $V_{RN}(r)$ for regions in which the functions differ between the original and warped models; this defines the perturbation.

At operation 24, warping is performed using the actions and parameters specified in operation 24. Since the travel time depends on both the location of the surfaces and the elastic properties, maintaining time-invariance (i.e. a given surface in the model will produce essentially equivalent time surfaces after demigration, such that the surfaces will essentially overlie or have essentially identical times at a given x-y location) means the surfaces at all depths in the earth model must be updated when any change to the elastic properties is made. This process proceeds as follows until a warped model is generated:

a. A copy of the model is made. This is the warped model, but at this point it is identical to the original.
b. For all sections in the model, a smoothed surface normal vector is computed for each vertex in the original model as follows: A set of triangles lying within a sphere of radius defined by parameter 24d and centered on the vertex is found, then triangles not physically connected to the vertex are discarded, then a weighted average of the normals of each remaining triangle is computed, with the weight being the area of the triangle. This value is the smoothed normal for the vertex.
c. The series of actions defined by the user (parameters 24b) are applied. The following details what occurs for each action:

i. Compute. For each vertex in the section, an exploding reflector ray (i.e., a ray traced from a horizon/surface in the earth model with its starting phase velocity vector parallel (or anti-parallel) to the horizon/surface) is traced in the original model from the vertex location s starting on the side corresponding to the user parameter (24c), in a direction consistent with the smoothed normal direction with the goal of hitting the datum surface (parameter 34c). If the ray succeeds and its aperture is within the limit defined by parameter 24f, its time t is recorded and the vertex is categorized as a successful vertex otherwise the vertex is categorized as failed. Then, if the ray was successful, from the datum and traveling in the reverse direction along the ray, time is integrated along the ray in the warped model using $V_{RN}(r)$ functions for regions where defined and otherwise $V_R(r)$. Integration proceeds until t is achieved or the full length of the ray is traversed. If the latter occurs, normal raytracing is continued along the reverse starting direction of the ray using the $V_R(r)$ or $V_{RN}(r)$ function for the ray's original starting region (in the warped model) until t is met. In either case the tentative revised position of the vertex is at n. A vector w=n−s, is formed. After rays for all vertices are traced, the w vectors are spatially smoothed using a Gaussian smoother with σ given by parameter 24f. Then w values for failed rays are interpolated from neighboring successful vertices, providing w values for all vertices. Each vertex for the current section in the warped model is shifted by its corresponding w value.

ii. Interpolate. w vectors for vertices are smoothed in from neighboring "Compute" sections using a Gaussian weighting defined by parameter 24f. Each vertex for the current section in the warped model is shifted by its w value.

iii. None. Vertices for this section are left unchanged in the warped copy of the model.

At operation 26, seams between sections of surfaces are identified and smoothed. Seams are simply triangles with vertices belonging to more than one section. For vertices lying within a distance of parameter 25b of a seam, corresponding w vectors are smoothed along the seam using a Gaussian smoother (parameter 25a). Each of these vertex locations is then set to s+w, where s is the original vertex location. The operation is then complete. FIG. 3C shows an example of the warped surface 32 overlain on the original sectioned surface from FIG. 3B. Surface 31 was not warped in this example.

The approach used in this invention warps models with accuracy approaching that of method A with a turnaround time approaching that of method C. The various smoothing operations incorporated (normals, warp vectors in sections and warp vectors along seams) help eliminate issues of warped surfaces crossing over themselves which is typical in more simplistic schemes involving raytracing.

Referring back to FIG. 1, after perturbing an elastic property while preserving travel times (operation 12) per the method 110 of FIG. 2, the modified earth model is generated (operation 14). The modified earth model may contain one or more warped surfaces, such as warped surface 32 in FIG. 3C. The modified earth model may then be used for seismic imaging or other subsurface characterization, including determining locations and extents of potential hydrocarbon reservoirs.

When interpreting a seismic image, seismic horizons are identified and traced throughout the subsurface volume of interest. Oftentimes, this volume of interest is near or below salt bodies because salt provides a good trap for potential hydrocarbon reservoirs. The modified earth model generated by method 100 can improve the imaging of seismic events near or below salt, allowing better interpretation. This may impact hydrocarbon reservoir delineation and well planning.

Figure 4:
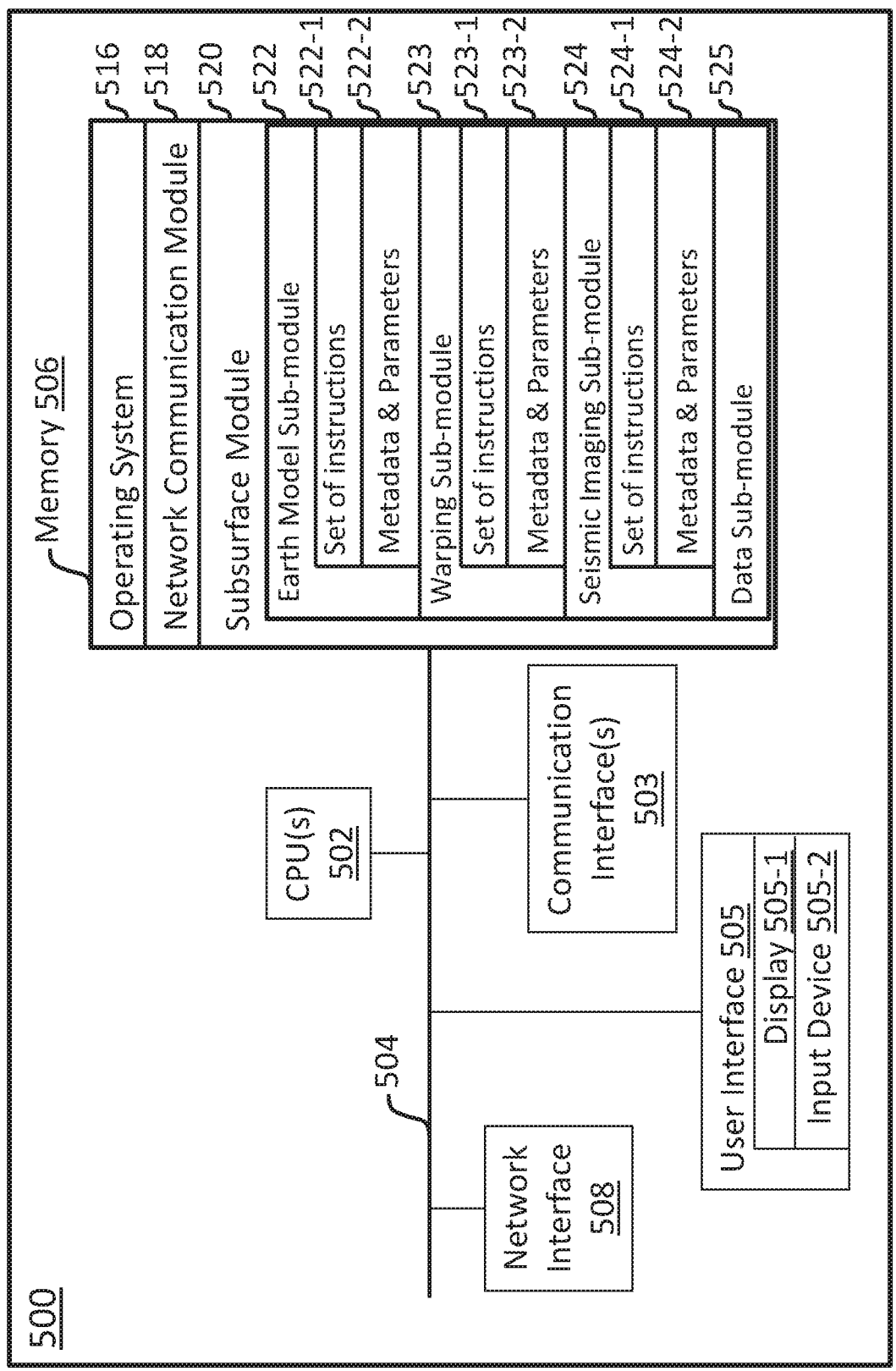
FIG. 4 is a block diagram illustrating a system for updating an earth model, in accordance with some embodiments.

FIG. 4 is a block diagram illustrating a computer system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the computer system 500 includes one or more processing units (CPUs) 502, one or more network interfaces 508 and/or other communications interfaces 503, memory 506, and one or more communication buses 504 for interconnecting these and various other components. The computer system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the subsurface module 520 executes the operations of method 100. Subsurface module 520 may include data sub-module 525, which handles the earth model, including seismic travel times, and/or seismic dataset. This data is supplied by data sub-module 525 to other sub-modules.

Earth model sub-module 522 contains a set of instructions 522-1 and accepts metadata and parameters 522-2 that will enable it to execute, for example, operations 10 and 14 of method 100. The warping sub-module 523 contains a set of instructions 523-1 and accepts metadata and parameters 523-2 that will enable it to contribute to operation 12 of method 100. The seismic imaging sub-module 524 contains a set of instructions 524-1 and accepts metadata and parameters 524-2 that will enable it to perform optional seismic imaging of the seismic dataset and the original and/or warped earth model. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data, generating a seismic image, or modifying an earth model. For example, any of the sub-modules may optionally be able to generate a display that would be sent to and shown on the user interface display 505-1. In addition, any of the earth model, seismic data, or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 5) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for modifying an earth model, comprising:
   a. receiving, at a computer processor, an earth model containing one or more surfaces with original surface geometries such that at least two surface depth locations exist for some horizontal positions, wherein the earth model is a representation of physical properties of a subsurface of interest;

b. perturbing elastic properties within the earth model; and
c. generating a modified earth model by modifying the surface geometries within the earth model such that seismic travel times of the modified surface geometries are equal to seismic travel times of the original surface geometries, wherein after an initial user parameterization all updates of the surfaces are done without additional user input.

2. The method of claim 1 wherein the modifying the surface geometries within the earth model comprises:
   a. receiving the earth model;
   b. dividing the surfaces into sections;
   c. specifying actions and parameters for each of the sections;
   d. warping each of the sections as specified by the actions and the parameters; and
   e. identifying and smoothing seams between each of the sections.

3. The method of claim 1 further comprising performing seismic imaging using the modified earth model.

4. A computer system, comprising:
   one or more processors;
   memory; and
   one or more programs, wherein the one or more programs are stored in the memory and configured to be executed by the one or more processors, to the one or more programs including instructions that when executed by the one or more processors cause a device to:
   a. receive, at a computer processor, an earth model containing one or more surfaces with original surface geometries, such that at least two surface depth locations exist for some horizontal positions, wherein the earth model is a representation of physical properties of a subsurface of interest;
   b. perturb elastic properties within the earth model; and
   c. generate a modified earth model by modifying the surface geometries within the earth model such that seismic travel times of the modified surface geometries are equal to seismic travel times of the original surface geometries, wherein after an initial user parameterization all updates of the surfaces are done without additional user input.

5. The computer system of claim 4 wherein the modifying the surface geometries within the earth model comprises:
   a. receiving the earth model;
   b. dividing the surfaces into sections;
   c. specifying actions and parameters for each of the sections;
   d. warping each of the sections as specified by the actions and the parameters; and
   e. identifying and smoothing seams between each of the sections.

6. A non-transitory computer readable storage medium storing one or more programs, the one or more programs comprising instructions, which when executed by an electronic device with one or more processors and memory, cause the device to:
   a. receive, at a computer processor, an earth model containing one or more surfaces with original surface geometries, such that at least two surface depth locations exist for some horizontal positions, wherein the earth model is a representation of physical properties of a subsurface of interest;
   b. perturb elastic properties within the earth model; and
   c. generate a modified earth model by modifying the surface geometries within the earth model such that seismic travel times of the modified surface geometries are equal to the seismic travel times of the original surface geometries, wherein after an initial user parameterization all updates of the surfaces are done without additional user input.

7. The non-transitory computer readable storage medium of claim 6 wherein the modifying the surface geometries within the earth model comprises:
   a. receiving the earth model;
   b. dividing the surfaces into sections;
   c. specifying actions and parameters for each of the sections;
   d. warping each of the sections as specified by the actions and the parameters; and
   e. identifying and smoothing seams between each of the sections.

* * * * *